(12) United States Patent
Tsai et al.

(10) Patent No.: US 6,863,794 B2
(45) Date of Patent: Mar. 8, 2005

(54) METHOD AND APPARATUS FOR FORMING METAL LAYERS

(75) Inventors: Stan Tsai, Fremont, CA (US); Shijian Li, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 247 days.

(21) Appl. No.: 09/961,134

(22) Filed: Sep. 21, 2001

(65) Prior Publication Data

US 2003/0057097 A1 Mar. 27, 2003

(51) Int. Cl.[7] .............................. C25D 5/06; C25D 5/18; C25D 11/32; H01L 21/288
(52) U.S. Cl. ...................... 205/117; 205/102; 205/103; 205/123; 205/157
(58) Field of Search ................. 205/117, 157, 205/123, 103, 102

(56) References Cited

U.S. PATENT DOCUMENTS

| | | | |
|---|---|---|---|
| 4,793,895 A | 12/1988 | Kaanta et al. | 156/627 |
| 4,839,005 A | 6/1989 | Katsumoto et al. | 204/129.46 |
| 4,934,102 A | 6/1990 | Leach et al. | 51/50 R |
| 5,217,586 A | 6/1993 | Datta et al. | 204/129.6 |
| 5,225,034 A | 7/1993 | Yu et al. | 156/636 |
| 5,534,106 A | 7/1996 | Cote et al. | 156/636.1 |
| 5,543,032 A | 8/1996 | Datta et al. | 205/670 |
| 5,567,300 A | 10/1996 | Datta et al. | 205/652 |
| 5,575,706 A | 11/1996 | Tsai et al. | 451/41 |
| 5,807,165 A | 9/1998 | Uzoh et al. | 451/41 |
| 5,846,882 A | 12/1998 | Birang | 438/692 |
| 5,911,619 A | 6/1999 | Uzoh et al. | 451/5 |
| 6,066,030 A | 5/2000 | Uzoh | 451/41 |
| 6,103,096 A | 8/2000 | Datta et al. | 205/686 |
| 6,176,992 B1 | 1/2001 | Talieh | 205/87 |
| 6,234,870 B1 | 5/2001 | Uzoh et al. | 451/8 |
| 6,248,222 B1 | 6/2001 | Wang | 204/297.09 |
| 6,328,872 B1 * | 12/2001 | Talieh et al. | 205/206 |
| 6,402,925 B2 * | 6/2002 | Talieh | 205/222 |
| 6,497,800 B1 * | 12/2002 | Talieh et al. | 204/224 R |
| 6,723,219 B2 * | 4/2004 | Collins | 205/103 |
| 2001/0024878 A1 | 9/2001 | Nakamura | 438/691 |
| 2001/0042690 A1 | 11/2001 | Talieh et al. | 205/118 |
| 2003/0029731 A1 * | 2/2003 | Ashjaee et al. | 205/137 |

FOREIGN PATENT DOCUMENTS

| | | | |
|---|---|---|---|
| JP | P2001-77117 A | 4/2001 | |
| WO | 98/49723 | 11/1998 | ......... H01L/21/321 |
| WO | WO 00/26443 | 5/2000 | |

OTHER PUBLICATIONS

Nogami; *An Annovation to Integrate Porous Low–K Materials and Copper; InterConnect Japan 2001*; Honeywell Seminar Dec. 6, 2001; pp. 1–12.

* cited by examiner

Primary Examiner—Edna Wong
(74) Attorney, Agent, or Firm—Moser, Patterson & Sheridan

(57) ABSTRACT

A method of forming a metal layer on a substrate is disclosed. The metal layer is formed using a combined electrochemical plating/electrochemical mechanical polishing (ECP/EMP) process. In the ECP/EMP process, the metal layer is deposited on the substrate by contacting the substrate with a porous pad and then alternately applying a first electrical potential and a second electrical potential to an electrolyte plating solution. The first electrical potential functions to deposit metal on the substrate while the second electrical potential functions to remove metal from topographic portions thereof.

10 Claims, 6 Drawing Sheets

METHOD AND APPARATUS FOR FORMING METAL LAYERS

BACKGROUND OF THE DISCLOSURE

1. Field of the Invention

The present invention relates to integrated circuit fabrication and more particularly to the formation of metal layers used in integrated circuits.

2. Description of the Background Art

In the fabrication of integrated circuits (IC's), substrate surface planarity is of critical importance. This is especially so as the scale of integration increases and device features are reduced in size (e.g., sub-micron sizes). Integrated circuits typically include metal layers that are used to interconnect individual devices of the IC. The metal layers are typically isolated from each other by one or more dielectric material layers. Features (e.g., trenches, vias, etc.) formed through the dielectric layers provide electrical access between successive conductive interconnection layers.

Copper is becoming a metal of choice in integrated circuits for the metal layers that provide the electrical access between successive interconnection layers. Copper is a material having advantageous properties such as lower resistance and better electromigration performance compared to traditional materials such as aluminum.

Copper may be deposited by various techniques such as physical vapor deposition (PVD), chemical vapor deposition (CVD) and electrochemical plating (ECP). ECP is seen as a low cost and effective deposition technique with promise. ECP entails the deposition of a metal conductive layer on a substrate by contacting the substrate with an electrolyte solution and providing an electrochemical potential between two electrodes. Copper ions plate out of the electrolyte solution and deposit onto the substrate.

However, copper is difficult to pattern and etch. Accordingly, copper features are typically formed using damascene or dual damascene processes. In damascene processes, a feature is defined in a dielectric material and subsequently filled with copper. The copper is deposited both in the features and on the surrounding field. The copper deposited on the field is then removed to leave the copper filled feature formed in the dielectric.

The copper deposited on the field may be removed using techniques such as chemical mechanical polishing (CMP). CMP is a common technique used to planarize substrates. In CMP, a chemical polishing slurry, or other fluid medium, used in conjunction with mechanical energy removes material from the substrate surface. In order to obtain a flat surface topography for the copper filled features using a CMP process, a thick layer of copper (e.g., thicknesses about 2 times that of the dielectric material) is typically deposited on the substrate and then removed during a subsequent CMP process. Depositing a thick copper layer and then removing it, undesirably wastes copper increasing fabrication costs as well as decreasing integrated circuit throughput.

Therefore, a need exists in the art for an improved method for depositing and planarizing a metal layer, such as a copper layer, on a substrate.

SUMMARY OF THE INVENTION

A method of forming a metal layer on a substrate is disclosed. The metal layer is formed using a combined electrochemical plating/electrochemical mechanical polishing (ECP/EMP) process. In the ECP/EMP process, the metal layer is deposited on the substrate by contacting the substrate with a porous pad and then alternately applying a first electrical potential and a second electrical potential to an electrolyte plating solution. The first electrical potential functions to deposit metal on the substrate while the second electrical potential functions to remove metal from topographic portions thereof.

An apparatus for depositing a metal layer on a substrate and selectively removing portions thereof is also disclosed. The apparatus integrates electrochemical plating (ECP) with electrochemical mechanical polishing (EMP).

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
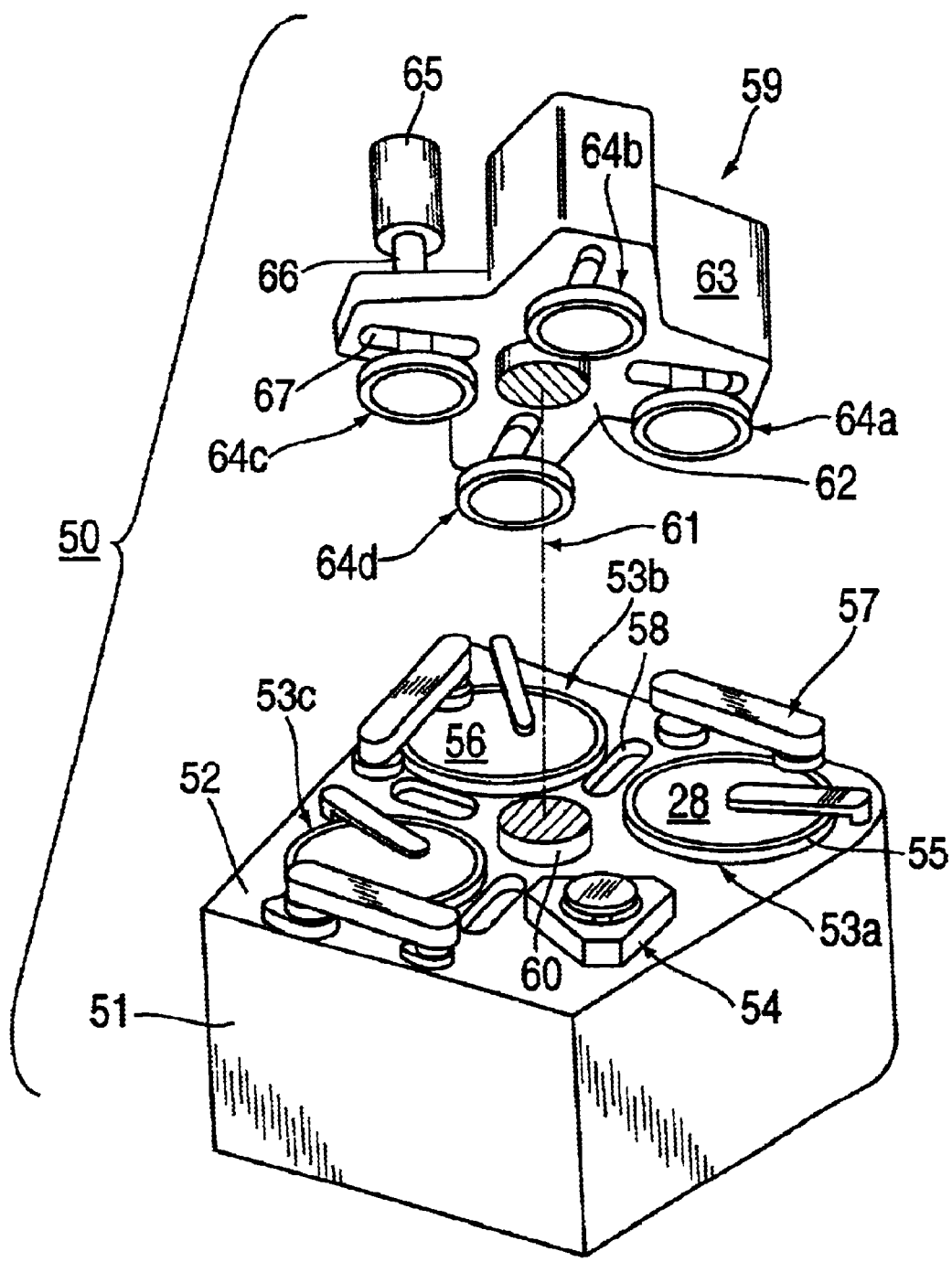
FIG. 1 depicts a schematic illustration of a ECP/EMP apparatus that may be used for the practice of embodiments described herein.

Embodiments described herein relate to a method for forming a metal layer. The metal layer is formed using an electrochemical plating/electrochemical mechanical polishing (ECP/EMP) process. FIG. 1 is a schematic perspective view of an apparatus 50 that may be used to form the metal layer as described herein. The apparatus 50 is a multi-station type such as is employed in automated semiconductor manufacture processing. The apparatus 50 is adapted to perform both electrochemical plating (ECP) and electrochemical mechanical polishing (EMP).

Referring to FIG. 1, the apparatus 50 includes a lower machine base 51 having an upper table surface 52 and a removable upper cover (not shown). The upper table surface 52 supports a plurality of substrate process stations 53a, 53b, and 53c, as well as a transfer station 54. The transfer station 54 performs multiple functions such as, for example, receiving individual substrates (not shown) from a loading apparatus (not shown), washing substrates, and loading/unloading substrates to/from carrier heads 64a, 64b, 64c, 64d.

Substrate processing station 53a may be an electrochemical plating/electrochemical mechanical polishing (ECP/EMP) station designed for plating and polishing metal layers. ECMPP station 53a includes a rotatable platen 55 on which is mounted a porous pad 28.

Substrate process station 53b may be a chemical mechanical polishing (CMP) station designed for planarizing plated metal layers. Chemical mechanical polishing (CMP) station

53b includes a rotatable platen 55 on which is mounted a polishing pad 56. Apparatus 50 may also include a barrier layer polishing station 53c designed for polishing barrier layer materials that may be present on a substrate.

Each of the processing stations 53a, 53b, 53c may optionally include a pad conditioner 57. The pad conditioner 57 is used to maintain the condition of the polishing pad 56.

Intermediate washing stations 58 may optionally be positioned between adjacent processing stations 53a, 53b, 53c and transfer station 54. The intermediate washing stations 58 are used to rinse substrates as they are passed from one station to the next.

As illustrated in FIG. 1, a rotatable multi-head carousel 59 is positioned above the lower machine base 51. The multi-head carousel 59 is supported by a center post 60 located on the upper table surface 52 and rotated about carousel axis 61 by means of a motor (not shown), located within the machine base 51. The center post 60 also supports a carousel base plate 62 and associated cover 63.

The multi-head carousel 59 includes four carrier heads 64a, 64b, 64c, 64d. Each carrier head 64a, 64b, 64c, 64d functions to hold substrates during a plating/polishing process. Each carrier head 64a, 64b, 64c, 64d may also function to move substrates to/from the transfer station 54.

Each carrier head 64a, 64b, 64c, 64d is mounted on the carousel base plate 62 at equal angular intervals about the carousel axis 61. The center post 60 permits the carousel motor (not shown) to rotate the multi-head carousel 59 and carrier heads 64a, 64b, 64c, 64d about carousel axis 61.

A carrier drive shaft 66 couples a carrier head rotation motor 65 to each carrier head 64a, 64b, 64c, 64d, so that each carrier head may be rotated about its own axis. In addition, each carrier head 64a, 64b, 64c, 64d may be oscillated laterally in a radial slot 67 formed in the bottom of the carousel base plate 62.

While FIG. 1 illustrates a plating/polishing system including one electrochemical plating/electrochemical mechanical polishing (ECP/EMP) station 53a, one chemical mechanical polishing (CMP) station 53b, and one barrier layer polishing station 53c, systems having two or more electrochemical plating/electrochemical mechanical polishing (ECP/EMP) stations and/or chemical mechanical polishing (CMP) stations are also contemplated.

Figure 2:
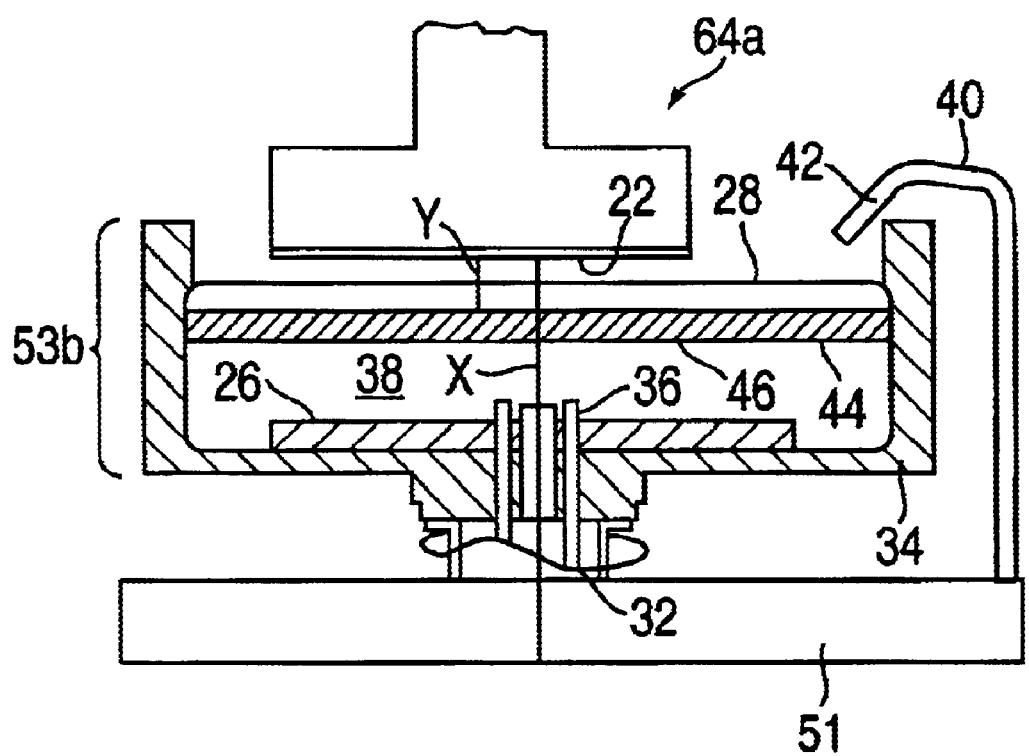
FIG. 2 depicts a schematic cross-sectional view of an ECP/EMP system that can be used to form metal layers on a substrate.

Referring to FIG. 2, a schematic cross-sectional view of an ECP/EMP station 53a is shown. A substrate 22 is held in place on the ECP/EMP head 64a. A partial enclosure 34 generally defines a container or electroplating cell within which a plating electrolyte may be confined.

The plating electrolyte typically comprises one or more metallic species selected from copper (Cu), aluminum (Al), tungsten (W), gold (Au), silver (Ag), among other materials, which can be electrochemically deposited onto the substrate 22. For example, copper sulfate ($CuSO_4$) may be used as the plating electrolyte. Copper-containing plating electrolyte solutions suitable for plating Cu on the substrate 22 include Ultrafill 2000, commercially available from Shipley Ronel, a division of Rohm and Haas, headquartered in Philadelphia, Pa. The plating electrolyte solution may optionally comprise pH adjusters such as, for example, sulfuric acid or acetic acid.

The partial enclosure 34 includes an anode 26, a diffuser plate 44, and a porous pad 28. The porous pad 28 is disposed on the diffuser plate 44. The partial enclosure 34 is typically a bowl shaped member made of a plastic material such as, for example, fluoropolymers, TEFLON®, and polyethylene, among other materials. The plastic material comprising the partial enclosure 34 should be compatible with the plating electrolytes used therein, such that they are non-reactive with each other.

The partial enclosure 34 is coupled to a shaft 32 that extends into the base 51. Alternatively, a mounting platform (not shown) may be interposed between the partial enclosure and the shaft 32. The shaft 32 is coupled to an actuator (not shown), such as, for example, a motor (e.g., a stepper motor) disposed in the base 51. The actuator is adapted to rotate the partial enclosure 34 about vertical axis x. Additionally, the shaft 32 has a plurality of ports 36 formed therein. The ports 36 define passageways through which fluid (e.g., plating electrolyte) is provided to the partial enclosure 34.

The anode 26 is positioned on the lower surface of the partial enclosure 34, such that it is immersed in the plating electrolyte. Anode 26 typically comprises a ring-shaped, plate-like member. The anode 26 may optionally comprise a plate having a plurality of holes formed therethrough, or multiple anode pieces disposed in a permeable membrane material.

The anode 26 is preferably formed of the material to be deposited on the substrate (e.g., copper (Cu), nickel (Ni), aluminum (Al), gold (Au), silver (Ag), and tungsten (W)), although it may optionally be formed of a material other than the material to be deposited such as, for example, platinum (Pt). The anode 26 may also comprise a consumable material, requiring the periodic replacement thereof.

The porous pad 28 is disposed on the diffuser plate 44. The porous pad 28 is preferably conductive to ions in the plating electrolyte such as copper ions, for example, used for copper plating applications. The metal plating electrolyte is supplied to the porous pad 28 through a fluid delivery line 40, having an outlet 42 positioned above the porous pad 28. The porous pad 28 may optionally be disposed adjacent to or placed in contact with the anode 26. Additionally, the porous pad 28 should be compatible with the plating electrolytes used for forming the conductive metal layer, such that they are non-reactive with each other. The porous pad 28 may optionally comprise a plurality of pores and/or grooves to provide electrolyte from the bulk solution in region 38 of enclosure 34 toward the gap between the substrate 22 and the porous pad 28.

The porous pad 28 may comprise a polymeric material such as polyurethane. Examples of suitable pads may include, for example, IC 1000 pads, IC 1010 pads, Suba series pads, Politex series pads, and MH S series pads, commercially available from Rodel, Inc., of Phoenix, Ariz. Other suitable pads include polyvinylidene fluoride (PVDF) pads commercially available from Asahi, Japan, and fixed abrasive pads commercially available from 3M Corporation, Minneapolis, Minn.

The diffuser plate 44 is used to support the porous pad 28 in the partial enclosure 34. The diffuser plate 44 may be secured in the partial enclosure 34 using fasteners such as, for example, screws 38. Other suitable fastening means may include snap or interference fit with the enclosure 34 (not shown), suspension attachment (not shown), and the like. The diffuser plate 44 may be made of a plastic material such as, for example, fluoropolymers, polyethylenes, and TEFLON®, among others. The diffuser plate 44 should also be compatible with the plating electrolytes used for forming the conductive metal layer, such that they are non-reactive with each other.

The diffuser plate 44 may optionally have a plurality of holes or channels 46 formed therein. The holes 46 are sized to enable fluid flow therethrough and to provide a uniform distribution of electrolyte through the porous pad 28 toward the substrate 22.

The porous pad 28 may optionally be fastened to the diffuser plate 44 using adhesives that are compatible with the fluid environment. The diffuser plate 44 is preferably spaced from the anode 26 to reduce the sensitivity of the plated conductive metal layer thickness to the anode dimensions.

A membrane (not shown) may be disposed between the anode 26 and the porous pad 28 to prevent particles and/or by-products produced at the anode from depositing on the substrate 22 surface. The membrane should be permeable to electrolyte flow, but not permeable to particles and/or by-products produced at anode 26.

The ECP/EMP head 64a is movably positioned above the porous pad 28. The ECP/EMP head 64a is both vertically and laterally movable relative to the porous pad 28. For example, ECP/EMP head 64a may be vertically movable about the x-axis, and rotatable about the y-axis. The x- and y-axes of the partial enclosure 34 and the ECP/EMP head 64a, respectively, are typically offset to provide orbital motion between the porous pad 28 and the ECP/EMP head 64a. Orbital motion is broadly described herein as an elliptical relative motion between the porous pad 28 and the ECP/EMP head 64a. The ECP/EMP head 64a holds a substrate 22 with the deposition surface facing downward toward the porous pad 28.

Figure 3:
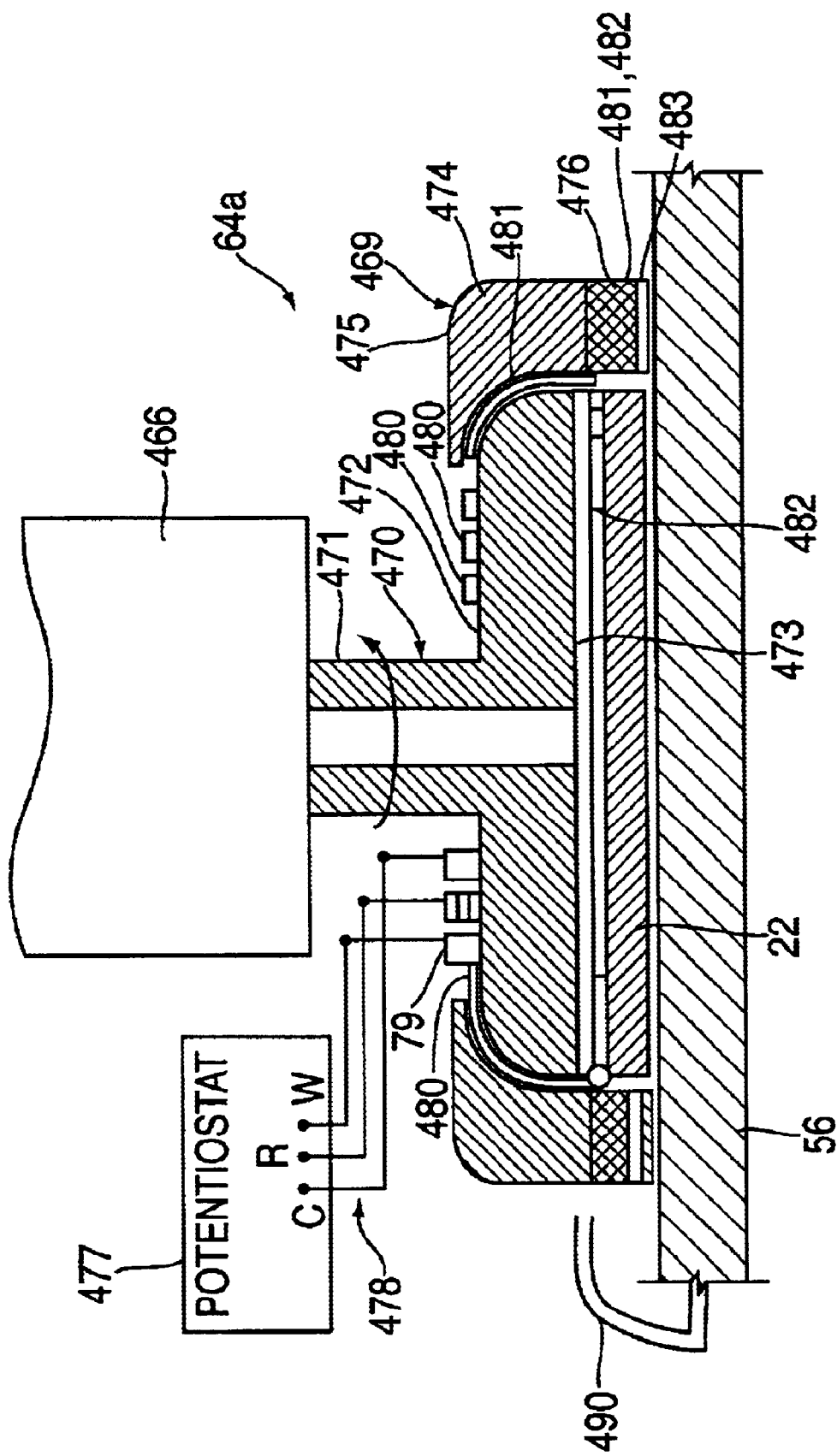
FIG. 3 depicts a schematic cross-sectional view of a portion of an ECP/EMP head system that can be used to form metal layers on the substrate.

FIG. 3 depicts a schematic cross-sectional view of an electrochemical plating/electrochemical mechanical polishing (ECP/EMP) head 64a. The ECP/EMP head 64a is in operative position facing a porous pad (not shown). A shaft or spindle 466 is operatively coupled to a head assembly 469. The head assembly 469 comprises a circularly-shaped, inner mounting piece 470 having a narrow, shaft-like, axially extending upper portion 471 coupled to a drive shaft 466. A lower portion 472 of the mounting piece 470 includes a diffuser plate 473 for mounting the substrate 22 thereon. The lower portion of the mounting piece also has an outer, annularly-shaped mounting piece 474 including an inwardly extending flange portion 475 at its upper end and an annularly-shaped retaining ring 476 at its lower end.

The ECP/EMP head 64a is adapted to provide for the controlled application of a time-varying electrochemical potential (e.g., a variable anodic potential) to substrate 22. A programmable electronic potentiostat 477 having working (w), counter (c), and reference (r) electrode outputs is operatively coupled to the head assembly 469 by means of respective electrical leads 478, brush-type electrical contacts 79, and concentric contact rings 480, formed on the upper surface of the lower portion 472 of mounting piece 470. Respective electrical leads connected to contact rings 480 are also connected to an annularly-shaped electrical contact located between the diffuser plate 473 and the rear surface of substrate 22 (inwardly of the substrate circumference), for permitting functioning of the substrate as a working (w) electrode. Electrical leads are also coupled to a plurality of counter electrodes 481 (e.g., formed of an electrochemically inert, electrically conductive material such as Pt or C) and reference electrodes 482 (e.g., formed of Pt or Ag/AgCl) positioned in grooved recesses 483 formed in the lower surface of retaining ring 476. A polishing/plating electrolyte is supplied to the pad 56 through a fluid delivery arm 490.

Alternatively, the reference electrodes 482 and the electrode potentiostat 477 may be replaced with a 2-electrode programmable DC power supply. Moreover, a coulometer may be electrically positioned in either the working electrode or counter-electrode circuit, for providing end-point indication/detection. Alternatively, a detector for measuring a physical property (e.g., eddy currents) or an optical property (e.g., reflectance as indicated by means of a conventional light source/photocell apparatus) for determining the end-point of ECP/EMP processing may also be used.

While the ECP/EMP head 64a is presented as having the configuration of component parts described above, other configurations are also contemplated.
Electrochemical Plating/Electrochemical Mechanical Polishing (ECP/EMP)

A metal layer such as copper may be deposited using a combined electrochemical plating/electrochemical mechanical polishing (ECP/EMP) technique. The metal layer is deposited on the substrate by contacting the substrate with a porous pad and then alternately applying a first electrical potential and a second electrical potential to an electrolyte plating solution. The first electrical potential functions to deposit metal on the substrate while the second electrical potential functions to remove metal from topographic portions thereof.

Figure 5A:
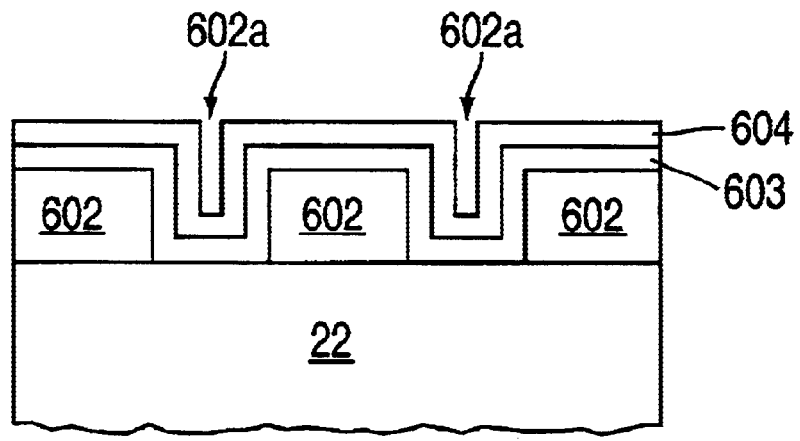
FIGS. 5a–5c depict schematic cross-sectional schematic views of a substrate during various stages of integrated circuit fabrication including an ECP/EMP process sequence.
Figure 5B:
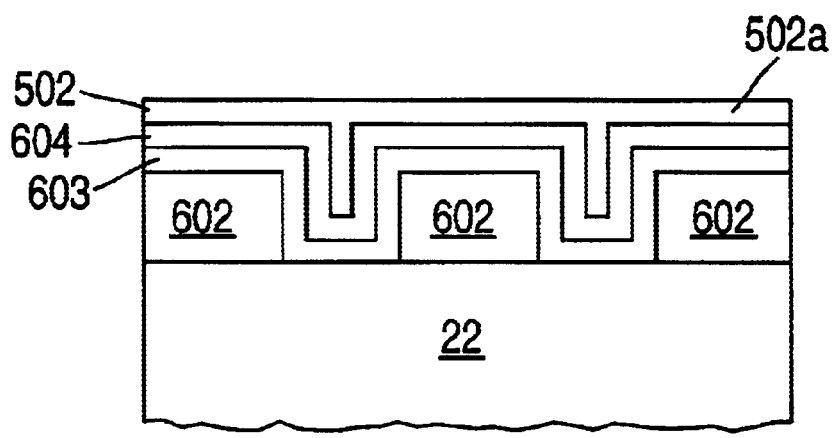
Figure 5C:
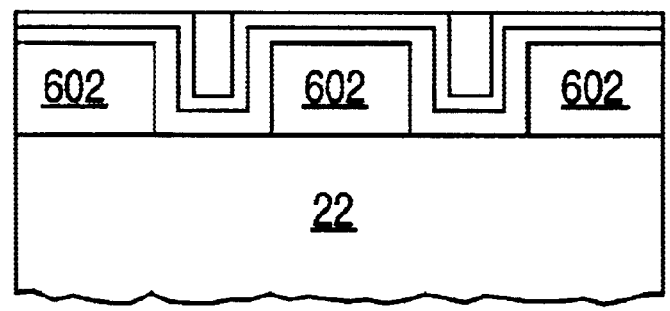

Referring to FIGS. 2, 3, and 5a, a substrate 22 is attached onto the ECP/EMP head 64b and positioned within the enclosure 34 of ECP/EMP station 53a. The substrate 22 may include, for example, a dielectric material 602, a barrier layer 603, and a seed layer 604. The dielectric material 602 has vias (holes) 602a defined therein.

A plating electrolyte solution is provided to the enclosure 34 from fluid delivery line 40. The substrate 22 is positioned such that selective portions thereof are in contact with the porous pad 28. The substrate 22, the anode 26, and the plating electrolyte solution define an electroplating cell. Using a power source, a potential difference is applied between the anode 26 and the working electrode (w). The potential difference applied between the anode 26 and the working electrode (w) is typically within a range of about 0.2 volts to about 5 volts. The applied voltage depends upon the nature of the pad material and cell configuration. The potential difference provides an electrochemical driving force for metal ions in the electrolyte solution to deposit on the surface of the substrate 22.

Figure 4A:
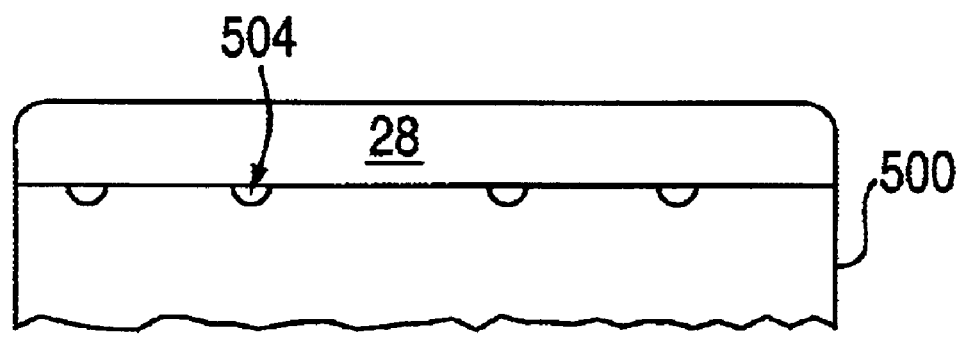
FIGS. 4a–4b depict schematic cross-sectional views of metal layer formation using an ECP/EMP process.
Figure 4B:
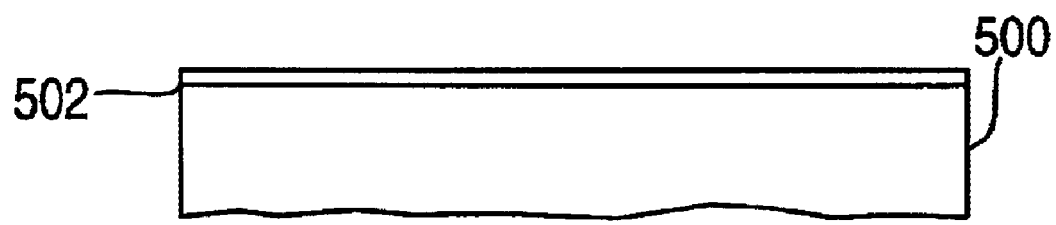
Figure 6:
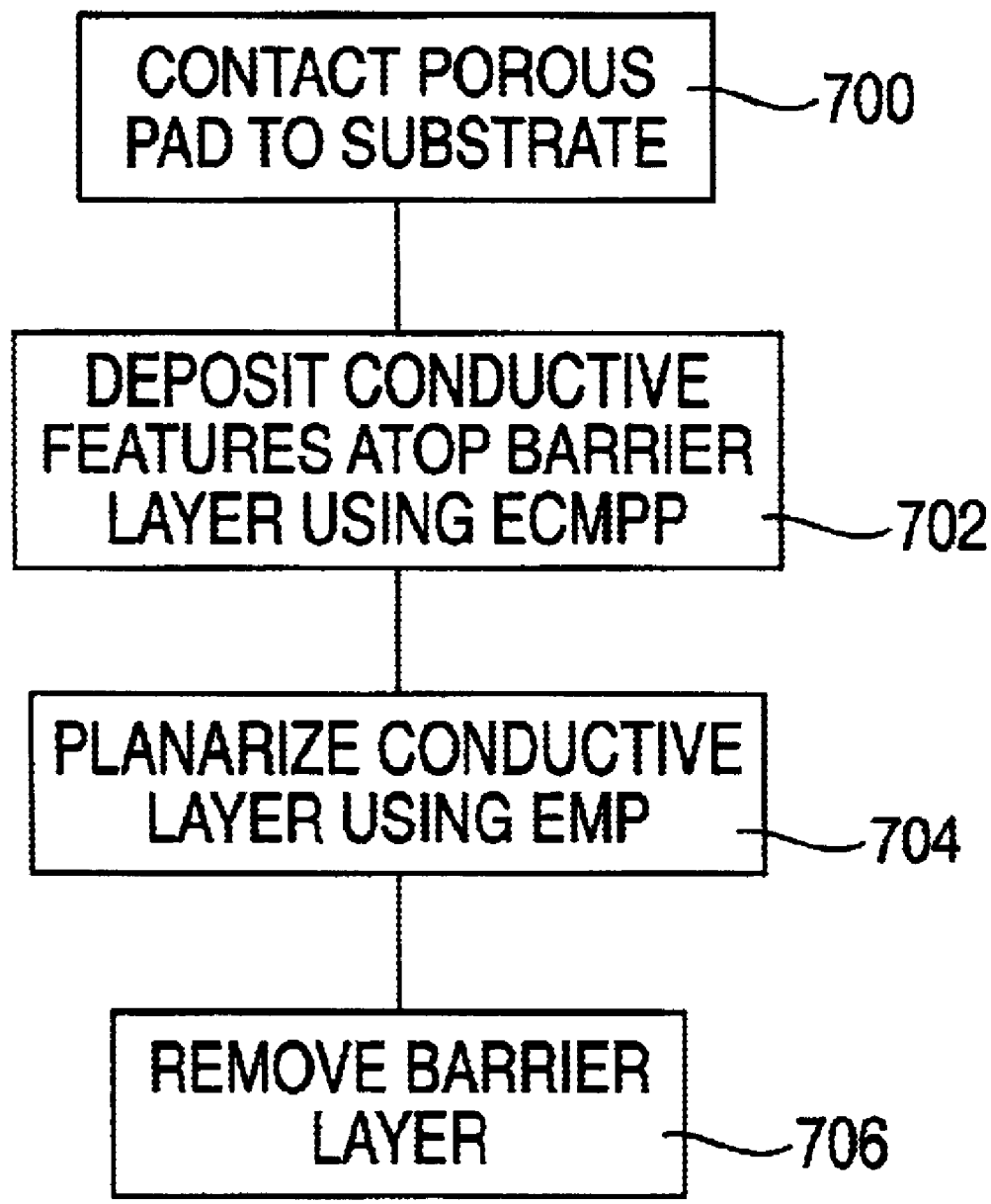
FIG. 6 illustrates a process flow diagram for a substrate undergoing an ECP/EMP process sequence.

Referring to FIGS. 4a and 6, the formation of the metal layer 502 begins with step 700. The porous pad 28 contacts selective portions of the substrate 22. The porous pad 28 may contact the selective portions of the substrate with a pressure in a range of about 0.1 psi and about 5 psi. The porous pad 28 and the substrate 22 may rotate relative to each other. For example, the porous pad 28 and the substrate 22 may both rotate off axis to provide orbital rotation. The substrate 22 and/or the porous pad 28 may each rotate at a velocity of about 20 rpm to about 150 rpm.

During the deposition process, the porous pad 28 acts to reduce the plating of metal on the selective portions of substrate 22 that are in contact with the porous pad 28. The porous pad 28 does not contact the surface of the substrate 22 in locations where localized depressions 504 exist, such that metal plating is enhanced in the localized depressions 504 (also vias 602a of FIG. 5a) of the substrate 22.

Concurrent with the deposition of the metal layer 502 on the substrate using ECP techniques, selected portions thereof may be polished using EMP techniques, as indicated in step 704 of FIG. 6. During the EMP process, the substrate 22 remains mounted on the ECP/EMP head 64a and immersed in the electrolyte solution used to deposit metal layer 502 thereon. The EMP process in conjunction with the ECP process functions to remove over-plated areas 502a of metal deposited on the dielectric material 602 by alternately applying a potential difference to the counter electrode c and the working electrode w.

The potential difference applied to the counter electrode c for EMP is typically within a range of about 0.2 volts to about 5 volts. The potential difference provides an electrochemical driving force for conductive material resident on the substrate 22 to migrate back into the electrolyte plating solution.

During EMP, the porous pad 28 may contact selective portions of the substrate 22. The porous pad 28 may contact the selective portions of the substrate with a pressure in a range of about 0.1 psi and about 5 psi. Additionally, the rotatable platen 55 with the porous pad 28 mounted thereon may be rotated at a velocity of about 20 rpm to about 150 rpm.

In the EMP process, the porous pad in conjunction with the electrochemical potential applied between the counter electrode c and the working electrode w provides for highly controllable as well as enhanced polishing rates for polishing the metal layer formed on over-plated areas 502a. The porous pad 28 does not contact the surface of the substrate 22 in locations where localized depressions 504 (vias 602a of FIG. 5a) exist. As such, the rate of polishing is reduced in the localized depressions 504 of the substrate 22 as compared to the contacted portions thereof.

For the ECP/EMP process, the applied potentials for each of the ECP and EMP processes may be controlled using a programmable electronic potentiostat 477. The applied potentials may be alternately applied for example, using varying magnitudes for the voltages. For example, during the initial stages of metal layer formation, a relatively high magnitude potential may be applied to the substrate 22 to promote a high rate of material deposition for ECP, while a relatively low magnitude potential may be applied for minimal material removal for EMP. When metal layer formation is at a later stage, the applied potential may be higher for EMP to increase the rate of material removal. The applied potential may optionally be static (have constant magnitudes throughout both the ECP/EMP process) or time-dependent.

The ECP/EMP process described above is advantageous in that it minimizes the waste associated with the deposition of metal layers on the substrate. Reducing the over-plating also improves the overall throughput and reduces operating costs for forming metal layers and features, since less metal needs to be removed to create the desired features. Using electrochemical energy during both the plating and polishing stages results in decreased reliance on chemical and oxidation mechanisms typical of CMP processes. Additionally, the method of the current invention does not suffer from the inherent variability associated with using chemical oxidizers and abrasives to process metal layers.

After the metal layer is formed 502 using the ECP/EMP process described above, the barrier layer 603 may be removed by transferring the substrate 22 to chemical mechanical polishing station 53b and/or barrier removal station 53c, as indicated in step 706 of FIG. 6. The process for removing the barrier layer may be a single step or multi step CMP process.

Although several preferred embodiments, which incorporate the teachings of the present invention, have been shown and described in detail, those skilled in the art can readily devise many other varied embodiments that still incorporate these teachings.

What is claimed is:

1. A method of forming a metal layer on a substrate, comprising:
    positioning a substrate in an electroplating cell having a porous pad and an electrolyte solution therein;
    contacting at least a portion of the substrate to the porous pad;
    forming a metal layer on the substrate by biasing the substrate relative to an electrode at a first electrical bias and then biasing the substrate relative to the electrode at a second electrical bias, wherein the first electrical bias deposits metal on the substrate and the second electrical bias removes metal from the substrate; and
    varying the magnitude of the second electrical bias relative to the first electrical bias as the metal layer is formed.

2. The method of claim 1, wherein the second electrical bias removes metal from the contacted portions of the substrate.

3. The method of claim 1, wherein the substrate and the porous pad move relative to one another during metal layer formation.

4. The method of claim 1, wherein the metal layer comprises copper (Cu), tungsten (W), nickel (Ni), aluminum (Al), gold (Au), silver (Ag), or combinations thereof.

5. The method of claim 1, wherein the porous pad contacts portions of the substrate with a pressure in a range of about 0.1 psi and about 5 psi.

6. The method of claim 1, wherein the electrolyte solution comprises one or more materials selected from the group consisting of water, pH adjusting agents, and metallic species.

7. The method of claim 1, wherein the first electrical bias has an opposite polarity from that of the second electrical bias.

8. The method of claim 1, wherein the first electrical bias and the second electrical bias are alternately applied to the substrate relative to the electrode within a range of about −5 volts to about 5 volts.

9. The method of claim 1, wherein the first electrical bias and the second electrical bias are alternately applied to the electrode for differing time periods.

10. The method of claim 1, wherein the first electrical bias applied relative to the electrode is within a range of about 0 volts to about +5 volts and the second electrical bias applied relative to the electrode is within a range of about 0 volts to about −5 volts are alternately applied.

* * * * *